United States Patent
Hobson et al.

(10) Patent No.: US 8,898,412 B2
(45) Date of Patent: Nov. 25, 2014

(54) METHODS AND SYSTEMS TO SELECTIVELY SCRUB A SYSTEM MEMORY

(75) Inventors: Louis B. Hobson, Tomball, TX (US);
Wael M. Ibrahim, Cypress, TX (US);
Manuel Novoa, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1792 days.

(21) Appl. No.: 11/689,055

(22) Filed: Mar. 21, 2007

(65) Prior Publication Data

US 2008/0235505 A1    Sep. 25, 2008

(51) Int. Cl.
*G06F 12/14* (2006.01)
*G06F 9/00* (2006.01)
*G06F 9/44* (2006.01)
*G06F 21/57* (2013.01)

(52) U.S. Cl.
CPC .............. *G06F 9/442* (2013.01); *G06F 21/572* (2013.01); *G06F 2221/2143* (2013.01)
USPC .................... 711/163; 711/154; 711/E12.091; 726/26; 713/2; 707/692

(58) Field of Classification Search
None
See application file for complete search history.

(56) References Cited

U.S. PATENT DOCUMENTS

| | | | |
|---|---|---|---|
| 5,532,935 A * | 7/1996 | Ninomiya et al. | 700/296 |
| 5,544,356 A * | 8/1996 | Robinson et al. | 707/205 |
| 6,549,995 B1 | 4/2003 | Schulz et al. | |
| 6,718,463 B1 * | 4/2004 | Malik | 713/2 |
| 6,754,815 B1 | 6/2004 | Ellison et al. | |
| 7,065,688 B1 | 6/2006 | Moyes et al. | |
| 2003/0084278 A1 * | 5/2003 | Cromer et al. | 713/2 |
| 2003/0196100 A1 * | 10/2003 | Grawrock et al. | 713/193 |
| 2005/0144432 A1 * | 6/2005 | Wu | 713/2 |
| 2006/0184846 A1 | 8/2006 | Hillier, III et al. | |

FOREIGN PATENT DOCUMENTS

| | | |
|---|---|---|
| CN | 1659497 A | 8/2005 |
| CN | 1841398 A | 10/2006 |
| TW | I272487 B | 2/2007 |
| WO | WO-2006/130383 A2 | 12/2006 |

OTHER PUBLICATIONS

Ramesh Srinivasan, Shutdown is very slow—Windows XP, Jun. 27, 2004, pp. 1-2, Retrieved from the http://windowsxp.mvps.org/slowshutdown.htm.
Anonymous: "System Management Mode" Wikipedia, Feb. 19, 2007,Retrieved from the Internet: URL: http://en.wikipedia.org/w/index.php?title=System%20Management%20Mode&oldid=109286538.
Anonymous: "Northbridge (Computing)" Wikipedia, Mar. 17, 2007,Retrieved from the Internet: URL: http://en.wikipedia.org/w/index.php?title=Northbridge%20(computing)&oldid=115693447.
EPO, 08725870.3-1243/12126687, PCT/US2008002277, Extended European Search Report, Jun. 28, 2010, pp. 1-7.
Louis Hobson et al., SIPO, Office Action dated Mar. 5, 2012, Pat. App No. 200880009020.8, filed Feb. 19, 2008.

* cited by examiner

*Primary Examiner* — D. J. Bernard

(57) ABSTRACT

A computer system is provided, the computer system having a processor and a system memory coupled to the processor. The computer system also includes a Basic Input/Output System (BIOS) in communication with the processor. The BIOS selectively scrubs the system memory during a shutdown process of the computer system.

20 Claims, 4 Drawing Sheets

METHODS AND SYSTEMS TO SELECTIVELY SCRUB A SYSTEM MEMORY

BACKGROUND

The Trusted Computing Group (TCG) has specified the concept of a memory override (MOR) bit. If the MOR bit is set, a Basic Input/Output System (BIOS) performs a memory scrub during a boot process to ensure secrets stored in system memory are deleted prior to being exposed.

Although the MOR bit can be used to prevent attacks (e.g., reset or power cycle attacks) from being effective, some existing implementations lack sophistication. For example, some computer systems maintain the MOR bit in a set condition, which causes the BIOS to unnecessarily perform a memory scrub during each boot process. Also, each memory scrub causes a delay in the boot process, which may cause a user to believe the computer system is "hung."

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments enable memory scrubs to be selectively performed during a shutdown process or a boot process. The shutdown process may be part of a shutdown, a restart, or a hibernation process. The memory scrub can be based on a memory override (MOR) bit or another control mechanism. If the memory scrub is performed during a shutdown process, the MOR bit is cleared so that a Basic Input/Output System (BIOS) does not perform another memory scrub during the subsequent boot process. In at least some embodiments, a memory scrub indicator is provided so that a user is aware that a memory scrub is being performed.

Figure 1:
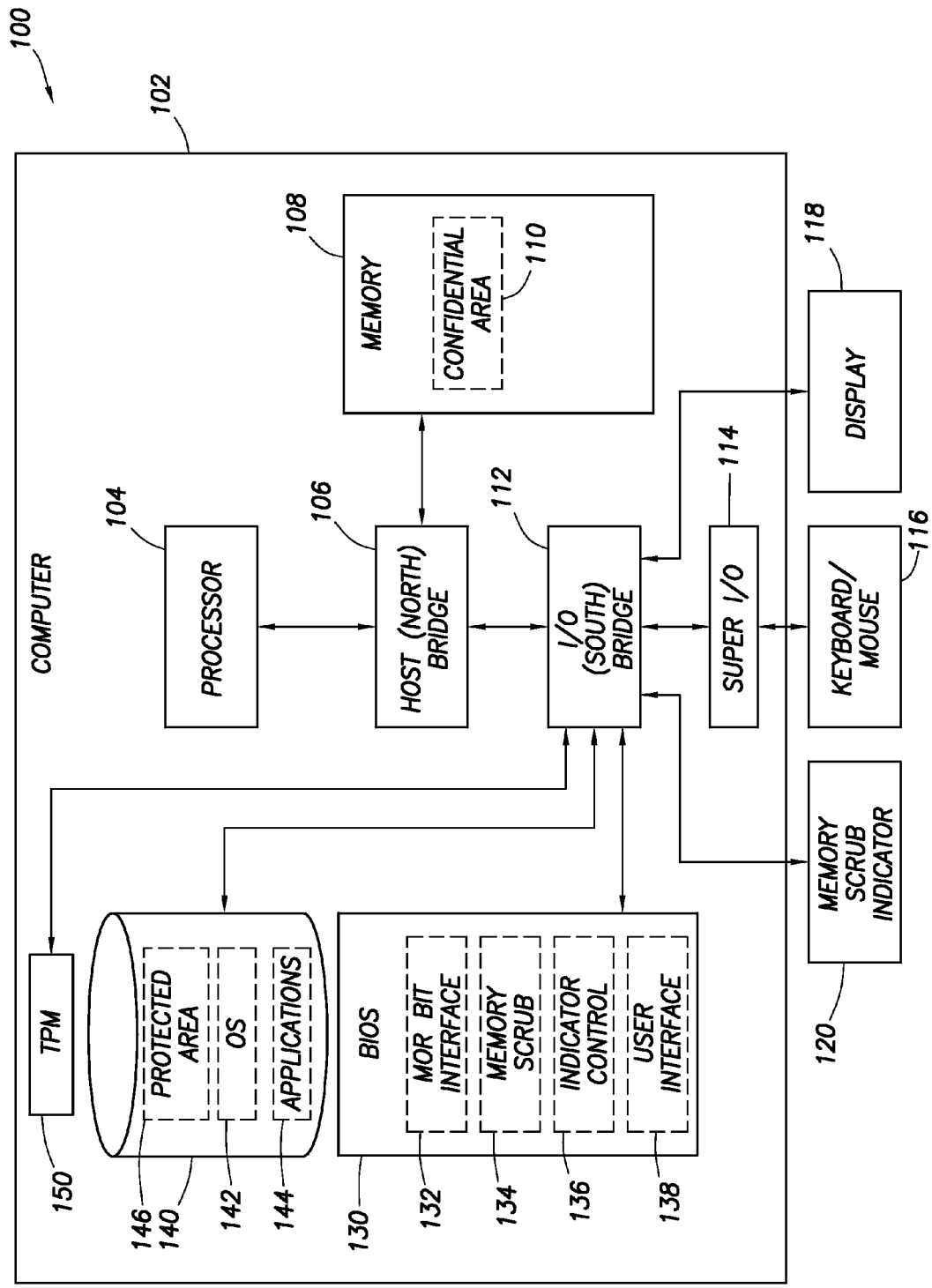
FIG. 1 illustrates a system in accordance with embodiments.

FIG. 1 illustrates a system 100 in accordance with embodiments. The system 100 comprises a computer 102 having a processor 104 coupled to a system memory 108, which may be Random Access Memory (RAM). The system memory 108 has at least one confidential area 110 that is used to store secrets such as passwords, encryption keys or other sensitive information. The confidential area 110 can be fixed or variable within the system memory 108. In at least some embodiments, a host bridge (sometimes referred to as a "North" bridge) 106 is placed between the processor 104 and the system memory 108. In alternative embodiments, an explicit "bridge" module between the processor 104 and the system memory 108 is not needed.

As shown, an input/output (I/O) bridge (sometimes referred to as a "South" bridge) 112 couples various components to the host bridge 106. In at least some embodiments, a display 118 and a memory scrub indicator 120 couple to the I/O bridge 112.

The display 118 may comprise a liquid crystal display (LCD) or another display that relies on a video card and/or video drivers. If a memory scrub is performed during a boot process, the video card and/or the video drivers may not yet be initialized and thus the display 118 cannot be used to notify a user that the memory scrub is being performed. In contrast, if a memory scrub is performed during a shutdown process, the video card and the video drivers could be operative and messages can be provided to a user via the display 118. For example, messages on the display 118 can indicate how much of a memory scrub has been performed, time remaining before memory scrub completion and/or other information.

Even if the display 118 is inoperative (during the boot process or the shutdown process), the memory scrub indicator 120 can provide information to a user. In at least some embodiments, the memory scrub indicator 120 comprises a light-emitting diode (LED) that indicates the duration or completion of a memory scrub. For example, a certain pattern of blinking or solid activity of the LED can indicate when a memory scrub is being performed and/or when a memory scrub is complete. In alternative embodiments, the memory scrub indicator 120 comprises an LCD that does not rely on a video card and/or video drivers as does the display 118. In such case, the memory scrub indicator 120 could display text that indicates how much of a memory scrub has been performed, time remaining for a memory scrub and/or other information even though the display 118 is inoperative. The memory scrub indicator 120 could be located on the display 118, on a keyboard, or some other location visible to a user of the system 100. Audio alerts could additionally or alternatively be used subject to similar conditions (e.g., audio alerts would not rely on an audio card and/or audio drivers).

In at least some embodiments, the I/O bridge 112 also couples to a Super I/O controller 114, a BIOS 130, a disk drive 140 and a Trusted Platform Module (TPM) 150. The Super I/O controller 114 provides an interface for a keyboard/mouse 116. In at least some embodiments, the Super I/O controller 114 and/or the I/O bridge 112 are able to detect a request to shut down the computer system 100 (including shutdown, hibernate or restart requests). The request may be received, for example, from the keyboard 116. In response, the Super I/O controller 114 and/or the I/O bridge 112 are able to trap the shutdown request and notify the BIOS 130. The BIOS 130 is then able scrub the system memory 108 before the shutdown request is complete.

The disk drive 140 comprises an operating system (OS) 142 and applications 144, which are executable by the processor 104. During runtime of the computer system 100 (or before), certain instructions or data related to the OS 142 and/or the applications 144 can be stored in the system memory 108. These instructions or data can be stored in the confidential area 110 or elsewhere in the system memory 108. Secrets can also be stored in the confidential area 110 as previously mentioned.

As shown, the disk drive 140 may also comprise a protected area 146, which corresponds to some or all of the disk drive 140. The protected area 146 is accessible through an authentication process which involves, for example, a password, a pass phrase, an encryption key, a biometric reading or another secret. Although not required, some embodiments rely on the TPM 150 to assist with the authentication process.

The TPM 150 is configured to provide cryptographic functions (e.g., an RSA asymmetric algorithm for digital signature and for encryption), SHA-1 hashing, a Hash-based Message Authentication Code (HMAC) function, secure storage, random number generation, or other functions The TPM 150 is implemented using software, firmware and/or hardware. TPM architectures and functions may possibly change over time as authorized by the TCG. Using the TPM 150, a secret can be authenticated to enable a user to access the protected area 146.

In at least some embodiments, the OS 142 comprises a secure OS that supports using the MOR bit as specified by the Trusted Computing Group (TCG). As at example, if a user requests access to the protected area 146, the OS 142 may set the MOR bit and store a secret associated with the user request in the confidential area 110. After the user has finished accessing the protected area 146, the OS 142 may clear the MOR bit and scrub the confidential area 110 to delete the secret. The particular timing regarding when the MOR bit is set and cleared can vary (e.g., the MOR bit can be set before or after the secret is stored in the confidential area 110 and can be cleared before or after the secret has been deleted). If OS security is enabled, the MOR bit may remain set regardless of whether a secret has been stored in or cleared from the confidential area 110. With the MOR bit set, the entire memory 108 (not just the confidential area 110) would be scrubbed during a subsequent boot process.

The BIOS 130 is stored on a computer-readable medium (e.g., a flash ROM) and comprises various instructions executable by the processor 104. In at least some embodiments, the BIOS 130 enables memory scrubs to be selectively performed during a shutdown process or a boot process. As shown, the BIOS 130 may comprise a MOR bit interface 132, memory scrub instructions 134, indicator control instructions 136 and a user interface 138. Some or all of these BIOS components are part of a BIOS boot block. These BIOS components can also be accessed using a System Management Mode (SMM).

The MOR bit interface 132 enables the BIOS 130 to access and update the MOR bit, which may be stored in a secure memory location of the BIOS 130 or elsewhere. For example, during a boot process, the BIOS 130 may check the status of a MOR flag. If the MOR bit is set to "scrub," the BIOS 130 performs a memory scrub based on the memory scrub instructions 134 as will later be described. If the MOR bit value is not set to "scrub," the BIOS 130 continues the boot process. Before or after the memory scrub is performed, the MOR bit interface 132 may cause the MOR bit to be cleared. The MOR bit "scrub" value may be high or low in different embodiments. As an example, if the MOR bit scrub value is high, clearing the MOR bit corresponds to setting the MOR bit to a low value (e.g., a logical "0"). If the MOR bit scrub value is low, clearing the MOR bit corresponds to setting the MOR to a high value (e.g., a logical "1").

In at least some embodiments, the BIOS 130 uses the MOR bit interface 132 to check the status of the MOR bit during a shutdown process. For example, the I/O bridge 112 and/or the Super I/O controller 114 may detect and trap a request to shutdown the computer system 100. The request may be identified by detecting when the OS 142 attempts to write to one or more registers (e.g., a sleep register or a reset register). In response, the I/O bridge 112 and/or the Super I/O controller 114 switch the computer system 100 to a System Management Mode (SMM), which operates without involvement of the OS 142.

During the SMM, the BIOS 130 is able to selectively clear the MOR bit. For example, if the MOR bit has been set by the OS 142 during runtime, the BIOS 130 may clear the MOR bit even if OS security is enabled. Before or after the BIOS 130 clears the MOR bit, the BIOS 130 may also scrub the system memory 108 using the memory scrub instructions 134. In at least some embodiments, the memory scrub instructions 134 enable the BIOS 130 to clear the entire contents of the system memory 108. As an example, if the system memory 108 has a capacity of 16 GB and the memory scrub operation clears memory at a rate of 1-2 GB/s, then the memory scrub would last between 8-16 seconds. By clearing the MOR bit and performing the memory scrub during shutdown, the BIOS 130 does not have to perform the memory scrub during the subsequent boot.

There are advantages to performing the memory scrub during the shutdown process rather than the boot process. For example, a user that is leaving the computer system 100 does not usually care if the shutdown process is extended for the memory scrub. In contrast, a user that arrives at and boots the computer system 100 usually wants to reach runtime as quickly as possible and does not appreciate the boot time being extended to perform the memory scrub. Additionally, audio/video cards and/or drivers may be available during the shutdown process, but not the boot process. Thus, if the memory scrub is performed during the shutdown process, a user could receive information regarding the status of the memory scrub via the display 118.

Even if audio/video cards and/or drivers are not available at the time the memory scrub is performed, the BIOS 130 implements indicator control instructions 136 that enable the BIOS 130 to control the memory scrub indicator 120. As previously discussed, the memory scrub indicator 120 may comprise an LED or LCD that does not rely on a video card and/or video drivers. Instead, the indicator control instructions 136 cause the memory scrub indicator 120 to provide information to a user in the form of LED light patterns or LCD text that indicates how much of a memory scrub has been performed, time remaining for a memory scrub and/or other information.

The user interface 138 of the BIOS 130 enables a user to select various options related to memory scrubs performed by the BIOS 130. In at least some embodiments, the user can access the user interface 138 via an F10 setup option that presents a menu to the user. As an example, the menu may enable a user to select options such as when memory scrubs are performed (e.g., immediately, during boot and/or during shutdown), activation/deactivation of the MOR bit 132 (e.g., some OSs may not support MOR bit operations), a MOR bit override (e.g., the BIOS 130 can perform memory scrubs without relying on the MOR bit or can perform memory scrubs even if the MOR bit is clear), activation/deactivation of the memory scrub indicator 120 or other options.

In summary, the computer system 100 is able to respond to reset attacks or power cycle attacks by performing a memory scrub early in the subsequent boot process. Additionally, the computer system 100 enhances usability of memory scrubs and the MOR bit by providing various options. For example, memory scrubs can be performed during a shutdown process and the MOR bit can be selectively cleared by the BIOS 130 to prevent a memory scrub from being performed during a subsequent boot process. As needed, the BIOS 130 can control the memory scrub indicator 120 to improve user awareness regarding memory scrub operations.

Figure 2:
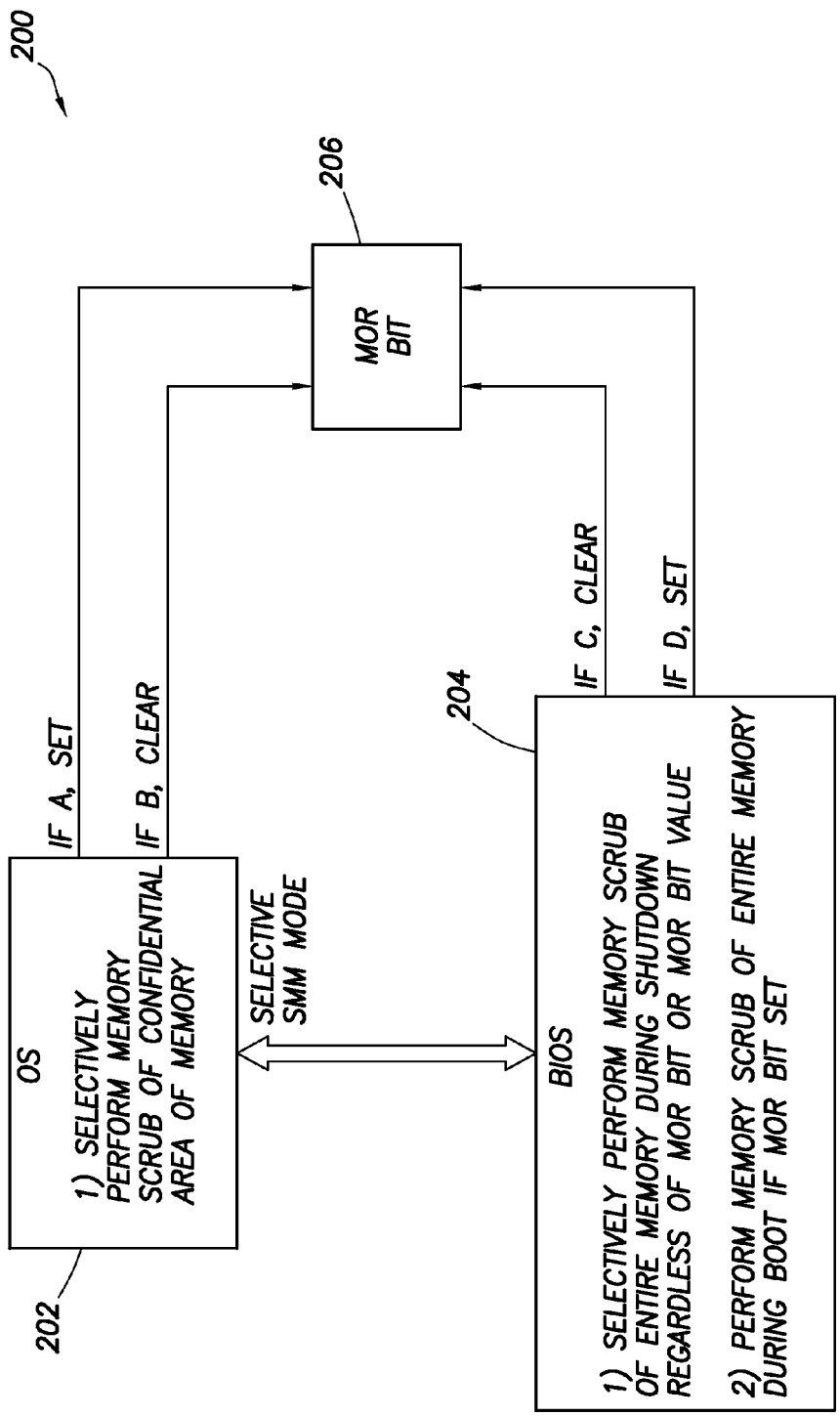
FIG. 2 illustrates access and use of a memory override (MOR) bit in accordance with embodiments.

FIG. 2 shows access and use of a memory override (MOR) bit 206 in accordance with embodiments. As shown, an OS 202 and a BIOS 204 selectively set and clear the MOR bit 206. The MOR bit scrub value may be high or low in different embodiments. As an example, if the MOR bit scrub value is high, setting the MOR bit corresponds to a high MOR bit value (e.g., a logical "1") and clearing the MOR bit corresponds to low MOR bit value (e.g., a logical "0"). Alternatively, if the MOR bit scrub value is low, setting the MOR bit corresponds to a low MOR bit value (e.g., a logical "0") and clearing the MOR bit corresponds to high MOR bit value (e.g., a logical "1").

In at least some embodiments, the OS 202 sets the MOR bit if an event "A" occurs. For example, the event A may correspond to a secret being stored in the confidential area 110 of the memory 108 or to the OS security being enabled. In at least some embodiments, the OS 202 clears the MOR bit if an event "B" occurs. For example, the event B may correspond to a secret being deleted from the confidential area 110 of the memory 108 or to the OS security being disabled. In some embodiments, the OS selectively performs a memory scrub of the confidential area 110 of the memory 108 to delete secrets, but does not scrub the entire system memory 108.

In at least some embodiments, the BIOS 204 clears the MOR bit if an event "C" occurs. For example, the event C may correspond to a secret being deleted from the confidential area 110 of the system memory 108 while OS security is enabled. In other words, with OS security enabled, some embodiments of the OS 202 do not clear the MOR bit even if the confidential area 110 has been cleared. In such case, the BIOS 204 can selectively clear the MOR bit. For example, the BIOS 204 may clear the MOR bit during a shutdown process so that a memory scrub is not performed during a subsequent boot process. As shown, a SMM mode can selectively be used to enable the BIOS 204 to clear the MOR bit. Alternatively, the event C may correspond to the BIOS 204 performing a memory scrub during a boot process. In such case, the BIOS 204 clears the MOR bit before or after the memory scrub is complete.

In at least some embodiments, the BIOS 204 sets the MOR bit if an event "D" occurs. For example, the event D may correspond to a user selecting a BIOS option to perform a memory scrub and to rely on the MOR bit. The memory scrub can be performed at the time the user selects the option, during a boot process or during a shutdown process. If the user selects to perform a memory scrub immediately, the BIOS 204 performs the memory scrub and the computer is rebooted. In some embodiments, the BIOS 204 relies on the MOR bit being set as a prerequisite to performing the memory scrub. Alternatively, the BIOS 204 may perform memory scrubs regardless of the MOR bit or the MOR bit value. For example, the BIOS 204 may selectively perform a memory scrub of the entire system memory 108 during shutdown without checking the MOR bit value or can perform the memory scrub even if the MOR bit is cleared. Even if a memory scrub of the entire system memory 108 occurs during shutdown, the BIOS 204 could still perform another memory scrub during a subsequent boot if the MOR bit is set.

Figure 3:
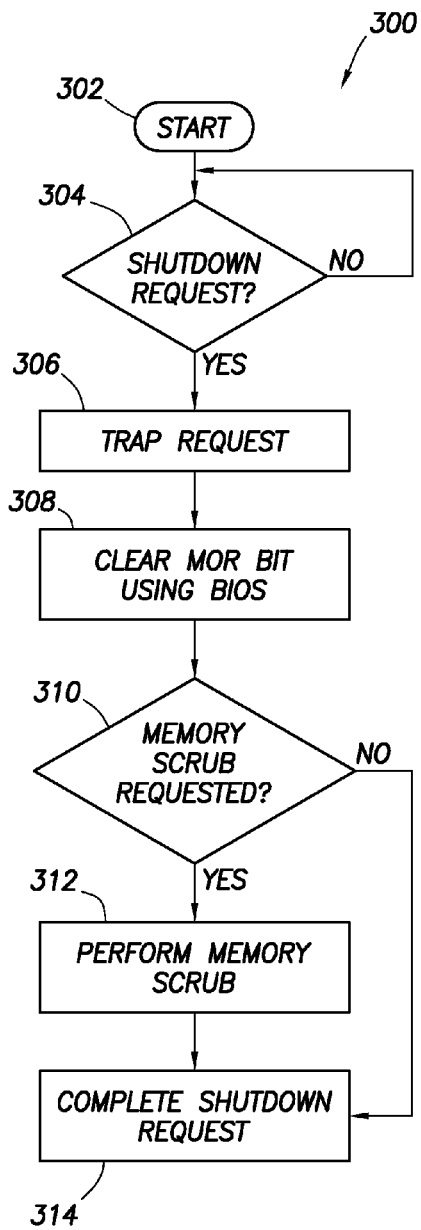
FIG. 3 illustrates a method in accordance with embodiments.

FIG. 3 illustrates a method 300 in accordance with embodiments. As shown, the method 300 starts at block 302. At block 304, the method 300 waits to receive a shutdown request. If a shutdown request is received (determination block 304), the shutdown request is trapped (block 306) and the MOR bit is cleared (block 308). For example, a BIOS operating in SMM could clear the MOR bit. In at least some embodiments, the MOR bit could be set (e.g., due to OS security being enabled) even if no secrets are stored in the memory to be scrubbed. If a memory scrub has been requested (determination block 310), the memory scrub is performed (block 312). For example, a BIOS operating in SMM could perform the memory scrub. If a memory scrub has not been requested (determination block 310) or the memory scrub at block 312 has already been performed, the method 300 completes the shutdown process (block 314). The shutdown process could be part of a hibernation processor or a restart process.

Figure 4:
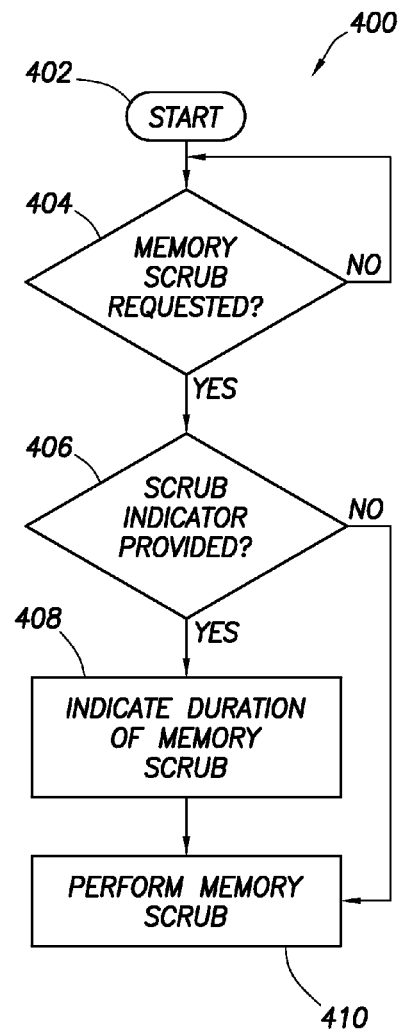
FIG. 4 illustrates another method in accordance with embodiments.

FIG. 4 illustrates another method 400 in accordance with embodiments. As shown, the method 400 starts at block 402. At block 404, the method 400 waits until a memory scrub is requested. If a memory scrub is requested (determination block 404), the method 400 determines whether a memory scrub indicator is provided at block 406. If a memory scrub indicator is provided (determination block 406), the duration of the memory scrub is indicated by the memory scrub indicator (block 408). For example, the memory scrub indicator could be an LED or LCD that does not depend on a video card and/or a video driver. If a memory scrub indicator is not provided (determination block 406) or the duration of the memory scrub has been indicated (block 408), the method 400 performs the memory scrub (block 410). In alternative embodiments, the memory scrub indicator could begin displaying information after the memory scrub has started. The method 400 can be performed, for example, during a boot process or during a shutdown process.

Figure 5:
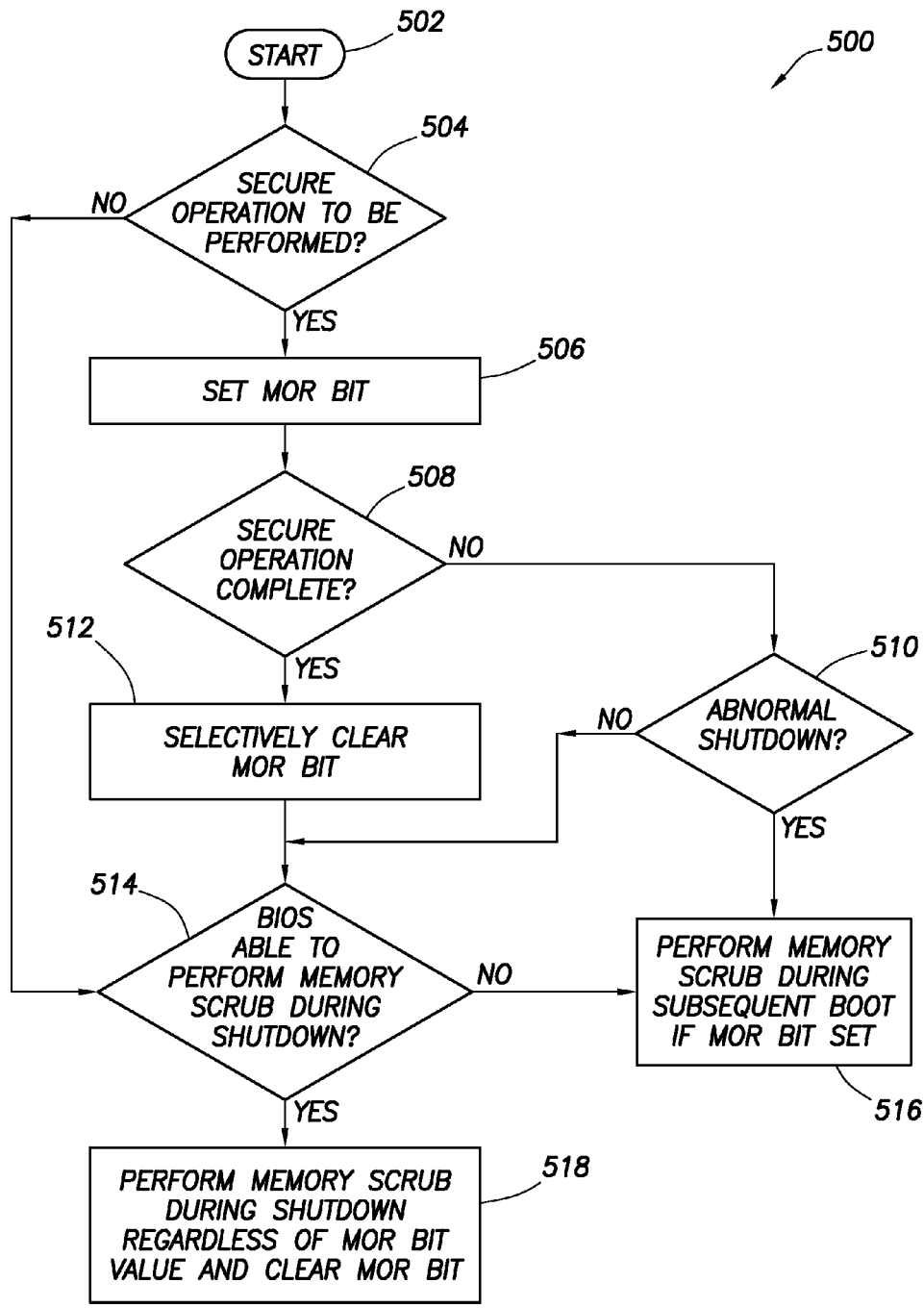
FIG. 5 illustrates yet another method in accordance with embodiments.

FIG. 5 illustrates yet another method 500 in accordance with embodiments. As shown, the method 500 starts at block 502. If a secure operation is to be performed (determination block 504), a MOR bit is set (block 506). As an example, the secure operation comprises accessing a protected area of a disk drive based on an authentication process. If the secure operation is completed (determination block 508), the MOR bit is selectively cleared (block 512). For example, if OS security is disabled, a secret related to the secure operation can be deleted once the secure operation is completed and the MOR bit can be cleared. If OS security is enabled, the MOR bit remains set regardless of whether a secret related to the secure operation has been cleared. Once the MOR bit is selectively cleared, the method 500 determines if a BIOS is able to perform a memory scrub during shutdown at block 514.

Returning to block 508, if the secure operation is not complete (determination block 508) and an abnormal shutdown occurs (determination block 510), the method 500 performs a memory scrub during a subsequent boot process if the MOR bit is set (block 516). If the secure operation is not complete (determination block 508) and an abnormal shutdown does not occur (determination block 510), the method 500 branches to block 514. The method 500 also branches to block 514 if a secure operation is not to be performed (determination block 504). If a BIOS is setup to perform a memory scrub during shutdown (determination block 514), a memory scrub is performed during shutdown regardless of the MOR bit value and the MOR bit is cleared (block 518). If the BIOS is not able to perform a memory scrub during shutdown (determination block 514), the method 500 performs a memory scrub during a subsequent boot process if the MOR bit is set (block 516).

The above discussion is meant to be illustrative of the principles and various embodiments of the present invention. Numerous variations and modifications will become apparent to those skilled in the art once the above disclosure is fully appreciated. For example, in some embodiments, memory scrubs performed by the BIOS 130 need not scrub the entire system memory 108. It is intended that the following claims be interpreted to embrace all such variations and modifications.

What is claimed is:

1. A computer system, comprising:
a processor;
system memory coupled to the processor;
a Basic Input/Output System (BIOS) executed by the processor; and
an input/output (I/O) bridge coupled to the processor, wherein the I/O bridge traps a shutdown request and causes the system to enter a System Management Mode (SMM) so that the BIOS scrubs the system memory during the shutdown process;
wherein the BIOS selectively scrubs the system memory during a shutdown process of the computer system.

2. The computer system of claim 1 further comprising an operating system (OS) executed by the processor, wherein the OS selectively sets a memory override (MOR) bit that causes the BIOS to scrub the system memory during a boot process of the computer system.

3. The computer system of claim 1 further comprising an operating system (OS) executed by the processor, wherein the OS selectively sets a memory override (MOR) bit and wherein the BIOS selectively clears the MOR bit during the shutdown process.

4. The computer system of claim 1 further comprising a disk drive coupled to the processor, the disk drive has a protected area that is accessible based on a secret stored in a confidential area of the system memory, wherein the BIOS selectively scrubs the system memory during the shutdown process regardless of whether the secret is stored in the confidential area.

5. The computer system of claim 1 further comprising a Super Input/Output (I/O) Controller coupled to the processor, wherein the Super I/O Controller traps a shutdown request and causes the system to enter a System Management Mode (SMM) so that the BIOS can scrub the system memory during the shutdown process.

6. The computer system of claim 1 wherein the BIOS comprises a user interface that enables a user to select when the BIOS performs a memory scrub.

7. The computer system of claim 1 further comprising a memory scrub indicator in communication with the BIOS, the memory scrub indicator displaying information regarding a memory scrub without support from a video card.

8. The computer system of claim 6 wherein the memory scrub indicator comprises at least one indicator selected from the group consisting of a Light Emitting Diode (LED) and a Liquid Crystal Display (LCD).

9. A method, comprising:
receiving, by a computer system, a shutdown request for the computer system; and
performing, by the computer system, a memory scrub before the shutdown request is complete; and
selectively clearing, by the computer system, a memory override (MOR) bit before the shutdown request is complete to prevent a memory scrub from being performed during a subsequent boot cycle;
trapping a shutdown request, by an input/output (I/O) bridge, to cause a Basic Input/Output System (BIOS) to scrub the computer system memory.

10. The method of claim 9 further comprising trapping the shutdown request and performing the memory scrub before the shutdown request is allowed to proceed.

11. The method of claim 9 further comprising entering a System Management Mode (SMM) that enables a Basic Input/Output System (BIOS) to clear the memory override (MOR) bit before the shutdown request is complete.

12. The method of claim 9 wherein a Basic Input/Output System (BIOS) performs the memory scrub during a System Management Mode (SMM) operation.

13. The method of claim 9 further comprising displaying information regarding the memory scrub without support from a video card.

14. The method of claim 9 further comprising enabling a user to select at least one of multiple options regarding when memory scrubs are performed, the options comprising performing a memory scrub during a boot process and performing a memory scrub during a shutdown process.

15. The method of claim 9 further comprising selectively setting the memory override (MOR) bit during runtime and selectively clearing the MOR bit during a shutdown process based on user input.

16. The method of claim 15 further comprising performing a memory scrub during a subsequent boot process if the MOR bit is not cleared during the shutdown process.

17. A non-transitory computer readable medium storing computer executable instructions that, when executed by a processor, causes the processor to:
selectively execute memory scrub instructions, stored in a Basic Input/Output System (BIOS), during a boot process and during a shutdown process of a computer system;
execute, user interface instructions, stored in the BIOS, that enable a user to select whether a memory scrub is performed during the shutdown process; and
wherein an input/output (I/O) bridge traps a shutdown request and causes the system to enter a System Management Mode (SMM) so that the BIOS scrubs the system memory during the shutdown process the memory scrub instructions are executed during a System Management Mode (SMM).

18. The non-transitory computer readable medium of claim 17, wherein the instructions further cause the processor to execute a memory override (MOR) bit interface that enables the BIOS to selectively clear a MOR bit during the shutdown process.

19. The non-transitory computer readable medium of claim 17, wherein the instructions further cause the processor to execute indicator control instructions that enable the BIOS to control a memory scrub indicator that displays information regarding a memory scrub.

20. The non-transitory computer readable medium of claim 17, wherein the instructions further cause the processor to execute a user interface that enables a user to select whether the BIOS considers a memory override (MOR) bit value before performing a memory scrub.

* * * * *

UNITED STATES PATENT AND TRADEMARK OFFICE
CERTIFICATE OF CORRECTION

PATENT NO. : 8,898,412 B2
APPLICATION NO. : 11/689055
DATED : November 25, 2014
INVENTOR(S) : Louis B. Hobson et al.

Page 1 of 1

It is certified that error appears in the above-identified patent and that said Letters Patent is hereby corrected as shown below:

In the Claims

In column 7, line 56, in Claim 8, delete "6" and insert -- 7 --, therefor.

Signed and Sealed this
Thirty-first Day of March, 2015

Michelle K. Lee
*Director of the United States Patent and Trademark Office*